United States Patent
Bohman

(10) Patent No.: US 10,325,319 B2
(45) Date of Patent: Jun. 18, 2019

(54) WEB PLATFORM WITH CUSTOMIZED AGENTS FOR AUTOMATED WEB SERVICES

(71) Applicant: Leif G. Bohman, Torekov (SE)

(72) Inventor: Leif G. Bohman, Torekov (SE)

( * ) Notice: Subject to any disclaimer, the term of this patent is extended or adjusted under 35 U.S.C. 154(b) by 0 days.

(21) Appl. No.: 14/037,586

(22) Filed: Sep. 26, 2013

(65) Prior Publication Data

US 2014/0095409 A1    Apr. 3, 2014

Related U.S. Application Data

(60) Provisional application No. 61/705,720, filed on Sep. 26, 2012.

(51) Int. Cl.
*G06Q 40/06*    (2012.01)

(52) U.S. Cl.
CPC ................... *G06Q 40/06* (2013.01)

(58) Field of Classification Search
None
See application file for complete search history.

(56) References Cited

U.S. PATENT DOCUMENTS

| | | | |
|---|---|---|---|
| 7,249,080 B1* | 7/2007 | Hoffman ............... | G06Q 40/00 705/35 |
| 8,566,184 B1* | 10/2013 | Paluck et al. .................... | 705/30 |
| 2002/0062300 A1* | 5/2002 | Asadov ............. | G06F 17/30861 |
| 2004/0193524 A1* | 9/2004 | Almeida ................ | G06Q 40/04 705/36 R |
| 2007/0078849 A1* | 4/2007 | Slothouber ............ | G06Q 30/02 |
| 2008/0126267 A1* | 5/2008 | Rosen et al. ................ | 705/36 R |
| 2008/0243716 A1* | 10/2008 | Ouimet et al. ............. | 705/36 R |
| 2009/0119224 A1* | 5/2009 | Petrino ....................... | 705/36 R |
| 2010/0293110 A1* | 11/2010 | Rosenthal ............. | G06Q 40/04 705/36 R |

\* cited by examiner

*Primary Examiner* — Scott S Trotter
(74) *Attorney, Agent, or Firm* — Banner & Witcoff, Ltd.

(57) ABSTRACT

A web platform for automated investment management services is provided. The platform may enable the automated management of client funds, invested in stocks and other traded assets such as commodities and gold, as well as other traded securities and financial instruments like stock options, stock funds, stock indexes, bonds and structured products. The platform may support customization based on each client's investment profile and policy. Agents may be dynamic and thus may enable the implementation of portfolio strategies that automatically adapt to changes in global financial and stock markets risk, as well as return and currency factors. In some embodiments, the platform may utilize genetic learning algorithms. The platform may support market making and distribution of third party funds and instruments, as well as an investor community, where clients can provide agents to allow others to co-invest.

20 Claims, 12 Drawing Sheets

WEB PLATFORM WITH CUSTOMIZED AGENTS FOR AUTOMATED WEB SERVICES

PRIORITY CLAIM

This application claims priority to U.S. Provisional Patent Application Ser. No. 61/705,720, filed Sep. 26, 2012, and entitled "Web Platform with Customized Agents for Automated Investment Management Services," the disclosure of which is incorporated by reference herein in its entirety and made part hereof.

BACKGROUND

Automated or algorithmic securities trading refers to the use of electronic platforms for entering trading orders with an algorithm, without human intervention. The precursors to automated trading were, among all, the computerization of order flows in financial markets in the early 1970s, and the emergence of electronic communication networks with fully electronic execution, developed in the late 1980s and 1990s. During the same period, the minimum tick size decreased, which was the catalyst to changing the market microstructure and encouraging the development of algorithm trading.

Both buy and sell side actors are today widely using such software, still primarily to divide orders, test the market and to execute trades. In the beginning of 2000s, the first algorithmic trading strategies were developed and subsequently some proved to be consistently outperforming human traders, such as the MGD algorithm based on the work of Steven Gjerstad and John Dickhouts, and the ZIP algorithm of Dave Cliff.

The focus of these first algorithmic trading strategies was and still is short term, on temporary mispricing in the markets. Computers could of course find and react to such anomalies more rapidly, examining prices in several markets simultaneously. Hence, the delay between transmission of information from a source and reception of the information at a destination, what is called "latency," became the key success factor for what has become high-frequency trading (HFT).

The growth in automated trading has substantially changed the micro market structure and increased the liquidity of stock markets. Still, there is no sign that market efficiency has increased. Market risk in terms of volatility remains on at least the same level as when algorithmic trading was introduced. In fact, there are many proponents that claim that HFT has increased risk and that nowadays liquidity to a large extent is illusionary, since it can electronically be withdrawn in milliseconds on the basis of a single indicator. Regardless, the use of automated trading has yet to be exploited in more long term investing. Today, short term automated trading is the leading market segment, in terms of volumes, in global investment management. There is no doubt that it has, so far, increased the short term orientation of stock markets.

Financial investing has a centuries long history and so has the professional management of investors' funds—investment management. Over time, financial markets have been diversifying into different security specific types, such as: (i) Stock markets; (ii) Bond markets; (iii) Commodity markets; (iv) Money markets; (v) Derivatives markets; (vi) Futures markets; (vii) Insurance markets, (viii) Foreign exchange markets. The time perspective of investors in these markets vary to a large extent, from HFTs milliseconds, day-traders, swing traders and short term speculators to longer term investors. For obvious reasons, these different types of investors and their advisors market data and information needs are radically different in content and their analytical methods and models are equally different.

Perhaps the most important market innovation for professional investment management was the introduction of mutual funds, where professionals could achieve economies of scale and scope by wholesaling their advice to investors. The growth in the fund management industry has been extraordinary since the 1970s, with a continuing diversification of new fund strategies and structures.

In contrast to the HFT, the traditional investment management industry has sustained an inherent dependency of the individual or team of asset and fund managers, their craftsmanship and biases. The development of modern finance theory helped to eliminate some of these biases, with professionals using the same portfolio theory and CAPM dependent analytics to diversify and pick stocks. Today most assets and fund managers use algorithms in their practices, but have not catered to rationalize and change their own profession. There is no doubt that this has been to the detriment of their clients, who still pay high fixed and performance fees that, alternatively, can be managed by automation and at a fraction of the cost.

At the same time, the high transaction costs and differentiated availability of stock market and corporate information among professional actors, has effectively blocked the full internationalization of the investment management industry. Even though most public corporations operate in what have become genuinely global markets, stock markets are to this day primarily domestic in character. These dysfunctions of financial markets are, in effect, both reducing private and professional investors' possibilities to diversify and blocking their potential to improve sustained risk-adjusted returns through global and automated investment management services.

SUMMARY

The following presents a simplified summary in order to provide a basic understanding of some aspects of the disclosure. This summary is not an extensive overview of the disclosure. It is intended neither to identify key or critical elements of the disclosure nor to delineate the scope of the disclosure. The following summary merely presents some aspects of the disclosure in a simplified form as a prelude to the description below.

In accordance with one or more aspects of the disclosure, a web platform with customized agents for automation of investment management services is provided.

The platform, hereinafter termed CATIS (Customized & Automated Trading and Investing Services), may include one or more of the following components:
  (i) A platform for customized global investment management web-services, including automated asset and fund management.
  (ii) An analytics engine and database with a CIM method and genetic FBLB algorithm based instruments for automated analysis, valuation and comparative ranking of stocks, regardless of market, sector, business activity and currency, and including other securities and traded assets, producing customized indicators for short-term trading and longer term investing.
  (iii) A portfolio configuration process, producing analytics engine based customized agents with models, portfolios and policies that manage the client's invested funds through algorithms connected with their own or external trading systems.

(iv) A learning engine for improving risk and return, according to each client's investment policies and financial objectives, and analyzes and values all investment objects on the same basis and with a single methodology.

CATIS is based on a portfolio configuration and stock picking process for customized agents, which may implement a genetic FBLB algorithm and the information it produces. The platform enables algorithm based management of client funds, consistent with each client's investment profile and policy. The customization of each agent may be dynamic and enable portfolio strategies that automatically adapt to changes in global financial and stock markets risk, return and currency factors, and may utilize learning mechanisms for each client's investment profile.

The analytics engine may receive real-time and periodical data and information from vendors and may run by a method for automated analysis and valuation that enables both total stockholder return analysis, valuation and ranking of investing objects and may function as a timing instrument for buy and sell decisions. The analytics engine may also produce customized indicators and use triangulation with fundamental corporate key ratios and technical analysis data, coherent with a client's investment profile and model.

A client's investment model and portfolio may be configured and allocated through a constrained satisfaction process, where target investment objects may first be identified through elimination and then may be optimized based on client policies and objectives.

The web-services platform may enable a single source for global investment management, and may include discretionary services, tailored models or a wide range of standard services, including funds. The platform may include trading systems for execution of trades and/or may be integrated with one or more external partner's trading system(s).

The web services platform may also allow clients to develop their own agents for other clients and investor community members to co-invest.

BRIEF DESCRIPTION OF THE DRAWINGS

Figure 1:
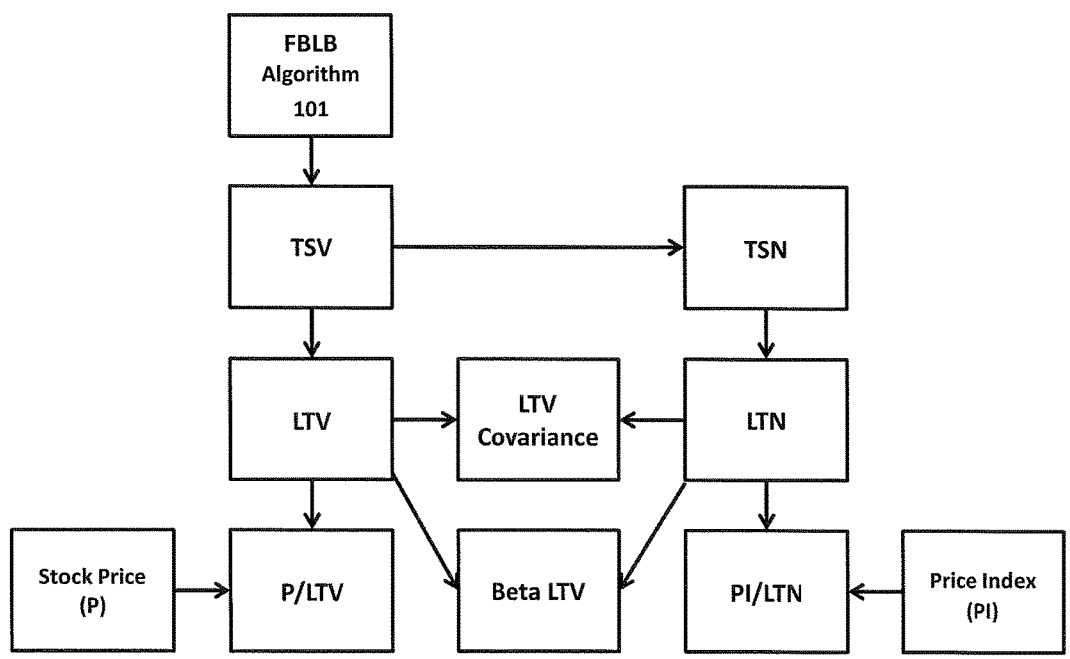

Having thus described the disclosure in general terms, reference will now be made to the accompanying drawings, which are not necessarily drawn to scale, and wherein:

FIG. 1 illustrates a generic FBLB algorithm and subsequent CATIS key ratios presented in an overview with dependencies in calculations.

Figure 2:
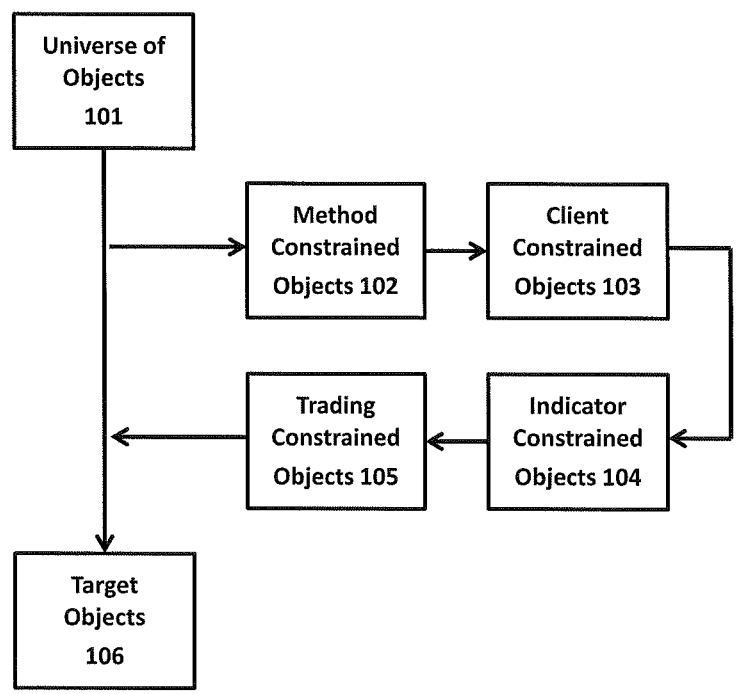

FIG. 2 illustrates a constrained satisfaction process of eliminating the universe of investment objects to a set of target investment objects.

Figure 3:
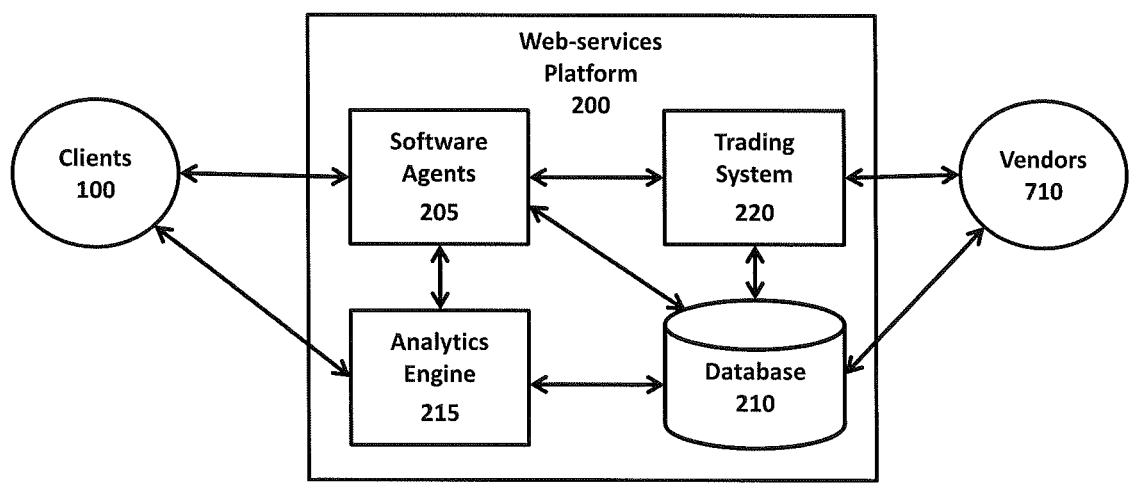

FIG. 3 illustrates one or more aspects of the CATIS platform for communicating client and/or vendor data and information.

Figure 4:
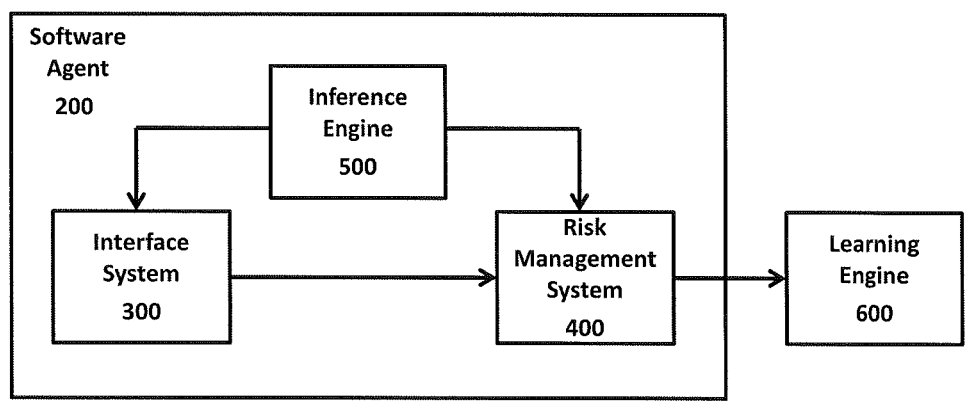

FIG. 4 illustrates an exemplary CATIS agent, having an inference engine, interface system, and risk management system.

Figure 5:
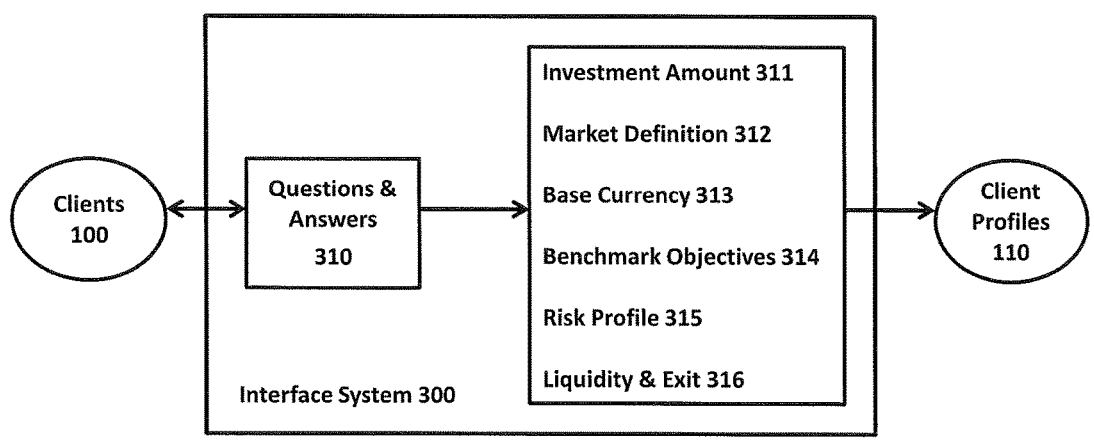

FIG. 5 illustrates a CATIS interface system determining a client profile.

Figure 6:
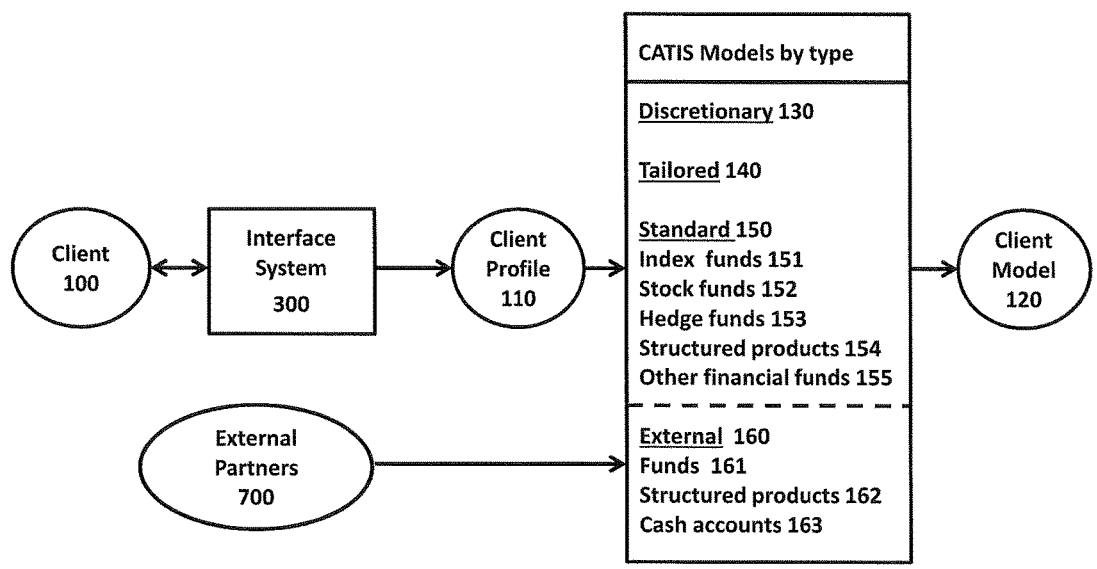

FIG. 6 illustrates a set of investment models by type, from which a CATIS client model may be selected.

Figure 7:
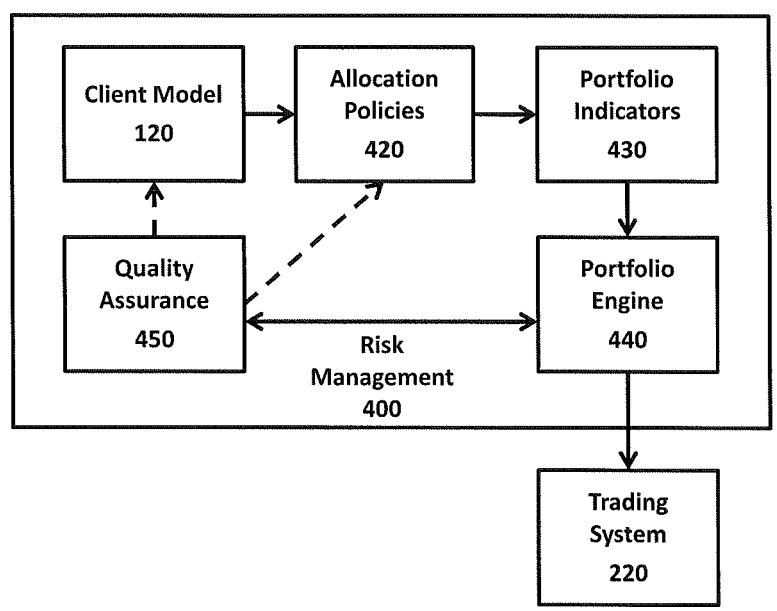

FIG. 7 illustrates an overview of one or more aspects of the CATIS risk management system.

Figure 8:
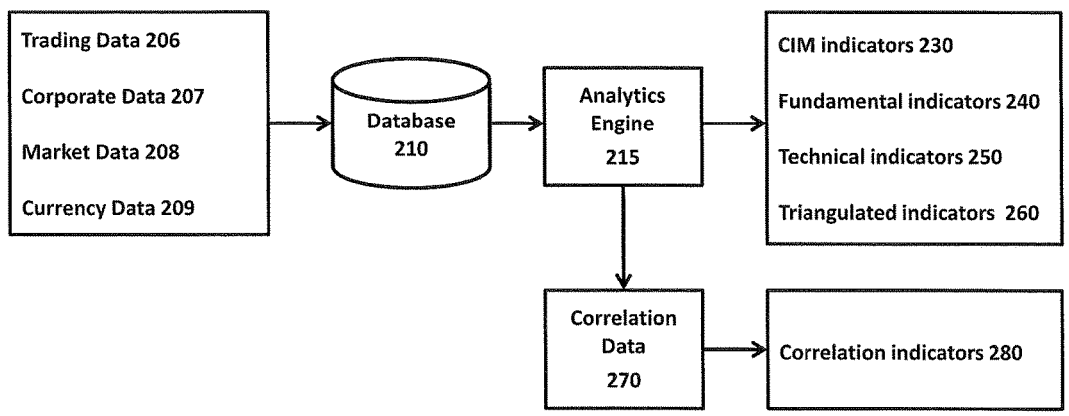

FIG. 8 illustrates an overview of one or more inputs and outputs of the CATIS analytics platform.

Figure 9:
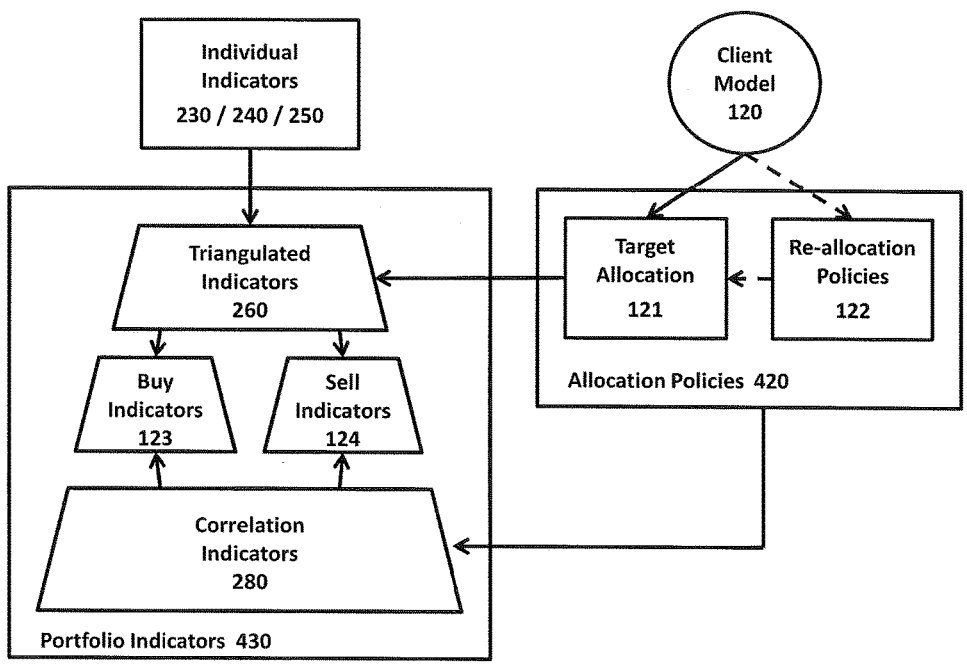

FIG. 9 illustrates a process of transforming a client model to buy and sell indicators for the portfolio engine.

Figure 10:
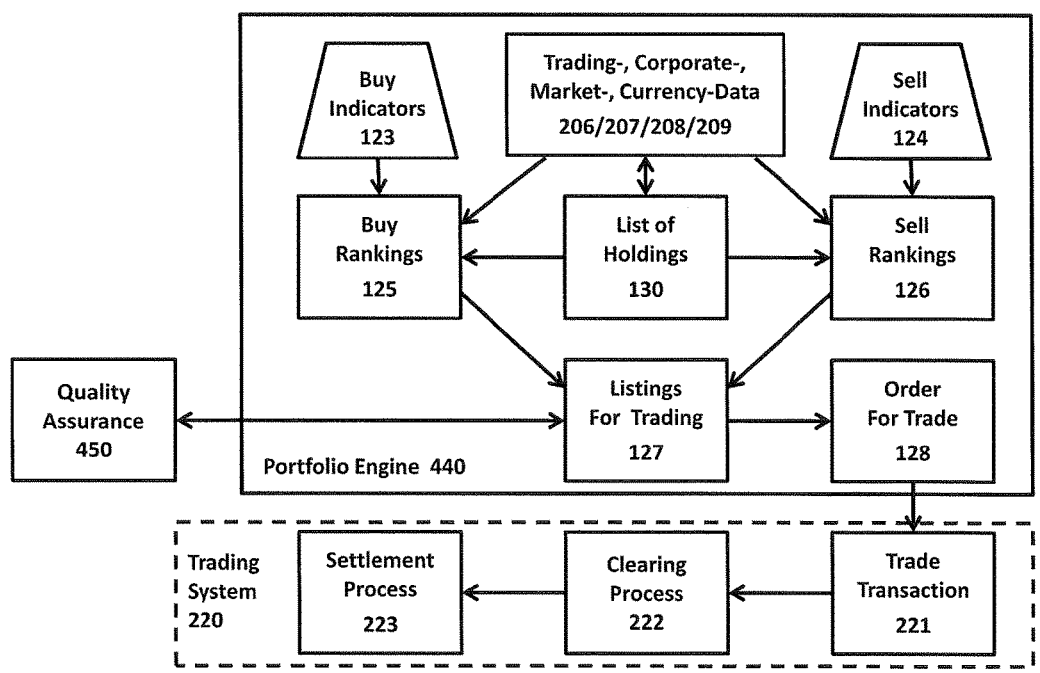

FIG. 10 illustrates a process of transforming buy and sell indicators to buy and sell rankings in the portfolio engine.

Figure 11:
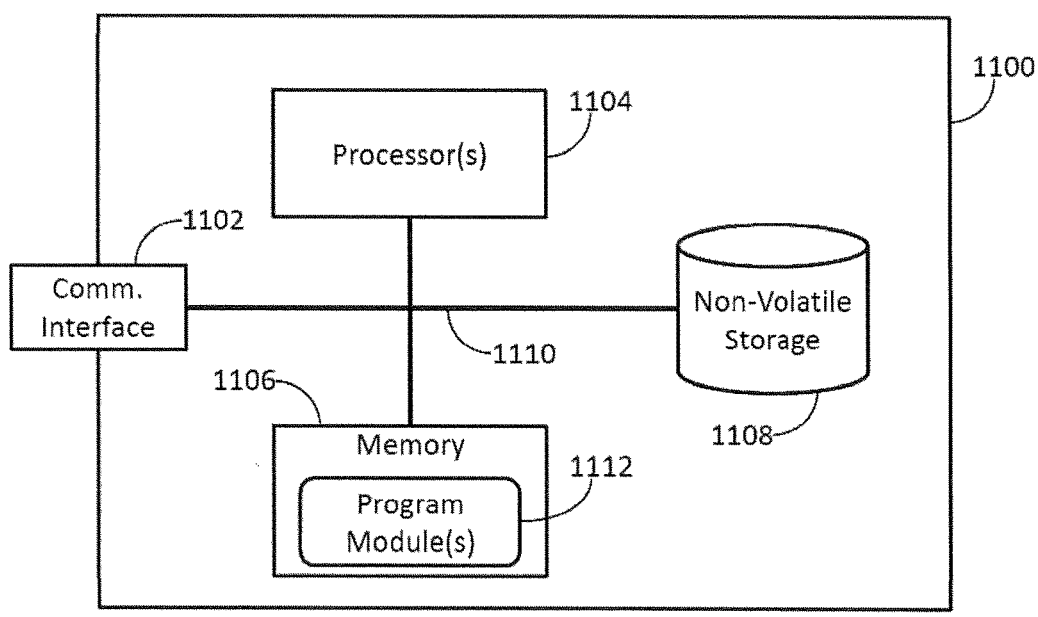

FIG. 11 illustrates an exemplary apparatus for performing one or more functions described herein.

Figure 12:
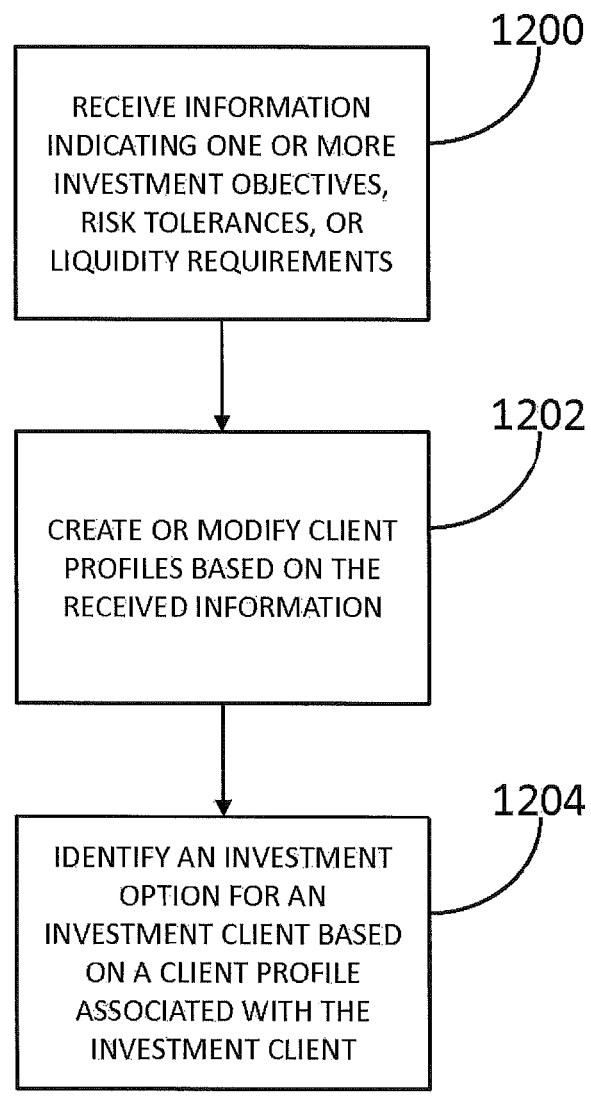

FIG. 12 illustrates an exemplary method according to one or more embodiments.

DETAILED DESCRIPTION

In accordance with one or more aspects of the disclosure, an automated investment management service, hereinafter termed 'CATIS' (Customized & Automated Trading and Investing Services), may be provided. The service may be provided utilizing a web-services platform, which may include customized agents. The platform may enable algorithm based management of client funds, invested in stocks and, for example, stock funds, stock market indices and other financial assets, and consistent with each client's investment profile and policy. The customization of each agent may be dynamic and thus may support portfolio strategies and stock picking that automatically adapt to changes in global financial and stock markets risk, return and currency exchange factors, and may utilize learning mechanisms for each client's investment behavior.

Internet web services are distributed information technology within corporations and in B2B and B2C modalities. They encapsulate a coherent set of applications and perform tasks with functional capabilities for invocation by software that is designed to support interoperable machine-to-machine interaction via a web-server and over a network. Web-services are programmatically encoded to execute on a web-server by exposing its knowledge and capabilities available to users and clients over HTTP.

A CATIS web service and application API may be published as a URL; may accept parameters and return data, and may be encoded in XML. Web services may be utilized to facilitate interoperability of information and decision-making processes.

Agents may comprise one or more programs for supporting a set of web services. Agents may be independent of a specific development technology (such as JAVA or .NET). An agent may perform services on behalf of a user or client, by providing access to specific computational resources that can be processed concurrently and activated by combination of policy and external or contextual actions and information. Hence, an agent may support making autonomous and non-biased decisions about how to act in a given situation (e.g., what and how to trade).

According to some embodiments, an expert system within the field of artificial intelligence may be a computer system that emulates the decision-making ability of a human expert. For investment management services the decision maker is traditionally a person managing clients assets discretionary or collectively through fund vehicles. Hence, an agent for investment management web-services may correspond to a type of expert system that performs the unbiased role of one or several investment managers through automation.

In some embodiments, expert systems may be divided into three parts: an inference engine; a variable knowledge base, and a dialog interface. The inference engine may be fixed and independent of the expert system applications.

The inference rules may use heuristics and fuzzy logic to eliminate choices and reach objectives. Inference rules may seek closest match and use classifiers, e.g., functions that perform pattern matching for this purpose. The knowledge base may be variable and the dialog interface may be used to communicate with one or more users or clients. The expert system may perceive its environment and take actions that maximize its chances of success by combining inference rules about the system and using methodological axioms for system processing.

It shall be appreciated that some of the terms used herein may differ from their semantic meaning and ambiguous use in business practice and academic theory. For example, the denoted differentiation of the price and value concepts, and contextually dependent concepts like market and risk, here, may not be recognized by conventional finance theory.

The following basic definitions are used throughout this specification, if not specifically stated otherwise. All values may be nominal, or inflation and/or currency adjusted, depending upon context.

Alpha=$\alpha_X$=the excess return of a stock or portfolio of stocks, in relation to a contextually defined expected market return.

Beta price risk=$\beta_X$=Var($P_X$)/Var(PI); the variance of a stock (X)s price, in relation to the variance of a selected Stock Exchange(s) market index (PI).

Beta value risk=$\beta_{LTV}$=Var($LTV_X$)/Var(LTN); the variance of a stock (X)s intrinsic value (LTV) to stockholders, in relation to the variance of the weighted intrinsic value for a population or portfolio of stocks (LTN).

CIM=Coherence Investment Management; a method for stock and stock market analysis and valuation, which may be used by CATIS and may include the generic FBLB algorithm.

Compounded Average Growth Rate (CAGR)=the ratio of end value to begin value raised to the power of 1/n years, where n is the number of years in the period being considered, such as;

$$CAGR_{(i,n)} = (V_n \div V_i)^{\frac{1}{n}}$$

and value (V) includes both price change and dividends received during the period.

Expected Price=E(P)=the median, average or weighted stock price (P), during a defined period.

Expected TSV=E($TSV_X$)=$R_F$+$\beta_{LTV}$(TSN+$R_F$)+$\alpha_X$, the generic total stockholder's value for time (X).

First Base Period (FB)=the first Hold Pricing (HP) period recorded, represented by a date and an expected price E(P).

Hold Pricing (HP)=a period of a minimum length of time, when price deviation of high and low closing price (P) is less than a decided maximum, or price (P) has less than a decided maximum variance (Var) during the period.

FBLB Algorithm (FBLB)=a genetic algorithm (GA) to search and identify unique FB and LB (1-n) for each stock.

Genetic Algorithm (GA)=a simulation programming technique to find approximates to a search problem that evolves towards better solutions, with a representation of the solution domain and a fitness function to evaluate the solution domain.

Iso-Prices (IP)=two stocks' prices (Px–Py), at a specific and same time, with equal percentage deviation (±) from their respective LTV.

Iso-Values (IV)=two stocks' prices (Px–Py), at a specific and same time, with equal TSV returns.

Last Base Period (LB)=the last Hold Pricing (HP) period, represented by a date and an expected price E(P).

Long-Term Value Trend (LTV)=E(P) at the time of the first base period (FB), times Total Stockholder Value (TSV) and compounded annually to the last base period (LB).

Long-Term Value Norm (LTN)=E(PI) at the time of the first base period (FB), times Total Stockholder Norm (TSN) and compounded annually to the last base period (LB).

LTV Correlation coefficient=$\rho_{LTV}$=cov(LTV,LTN)÷($\sigma$LTV)($\sigma$LTN), LTV Covariance $cov_{LTV,LTN}$=(E(LTV)*(E(LTN))–(LTV–E(LTV))(LTN–E(LTN)); the joint distribution of LTV and LTN, where E(LTV) and E(LTN) are expected values.

Price (P)=the past or present, incremental or end of day closing price for a stock, when traded on a public market Stock-Exchange.

P/LTV=the stock price in relation to stockholders value, determining if market pricing is at discount or premium.

PI/LTN=the market price index in relation to a market norm, determining if a market is trading at discount or premium.

Price index (PI)=a decided stock or other financial market index, used as a benchmark in a specific context.

$R_F$=the risk free return of a financial investment.

Standard deviation=$\sigma_X$=$\sqrt{(P-E(P))^2/n}$, the square root of the variance (Var) for a stock price distribution (X) from an expected stock price E(P).

Total Stockholder Norm (TSN)=the weighted Total Shareholder Value (TSV) of a defined population of stocks and/or other investment objects, e.g., for a specific combination of markets and/or sectors, or otherwise defined population or portfolio.

Total Stockholder Value (TSV)=the Compounded Annual Growth Rate (CAGR) for a stock with minimum years of track-record on a public market, between the first base period (FB) and the last base period (LB).

Variance (Var)=the distribution of stock (X) price (P) from the expected price E(P), during a period (n): $Var_X$=(P–E(P))²/n.

CIM Method

In some embodiments, CATIS may utilize a financial and investment methodology and information processing system that may be termed; Coherence Investment Management (CIM). The CIM method is described in U.S. patent application Ser. No. 12/980,688, entitled "Methods and Systems for Comparing Stocks," the disclosure of which is incorporated by reference herein in its entirety. The CIM method may be analytically objective and, in some embodiments, may not take any position on corporate affairs, management, business or technology. The CIM method may be based on general principles of analysis, which according to some embodiments may enable the development of automation investment management services and models of infinite variety.

The analytical foundation of the CIM method may separate stocks price movements from stocks value to stockholders. In some embodiments, the CIM method may analyze the dynamic relationships between market price and stockholder value, and utilize the FBLB algorithm for the analysis of each stock, market or sector. This may be achieved based on the axiom that random end of day and marginal prices (P) are the product of a stockholder's value trend (LTV) and market price deviations (P/LTV). Hence, the expected market price for a time (X) may be calculated as E($P_X$)=($P_{X-1}$÷$LTV_{X-1}$)/$LTV_X$, which means that the CIM method according to an embodiment proposes that market price follows stockholders' value.

According to some embodiments, the CIM method may be based upon refuting the efficient market (EMH) and may comprise one or more interpretations of the concepts of market, price, value, norm and risk—as well as processing of information to produce what is comparative rating information about stocks, regardless of geographical market and business activity.

FIG. 1 illustrates a generic FBLB algorithm and subsequent CATIS key ratios presented in an overview with dependencies in calculations. For example, FIG. 1 illustrates the relationships between the main variables and concepts; TSV, LTV, $\beta_{LTV}$, P/LTV, IP and IV for individual stocks.

The genetic algorithm, FBLB, may enable a stock unique calculation of the basic stock valuation variable TSV, as in FIG. 1. At the same time, according to an embodiment, the TSV derivative may be transformed into a Long-Term Value Trend (LTV), which may be compared with closing stock price (P) to establish the CIM method stock premium-discount indicator (P/LTV). The ratio of P to LTV may provide the information if a stock is trading in line with its stockholder value trend, or if it is presently trading at a premium or discount. LTV may also be used to establish the stock indicators Beta LTV and LTV Covariance.

$\beta_{LTV}$ may be used as the basic risk measurement in the CIM method but risk management may also include third moments skewness and fourth moments kurtosis. According to an embodiment, stock populations may be both asymmetric and have fat tails.

In some embodiments, Alpha may be contextually defined, as may be the separation of Alpha and Beta. According to some embodiments, Alpha based exposures may become commoditized, which may mean that total returns are dependent upon combined allocation and timing, e.g., stock picking.

TSV and LTV, as in FIG. 1, may also be used as market and sector norms, through the calculation of weighted values of a population of stocks; TSN and LTN. Both TSN and LTN may be monitored over time to establish if the market or sector is presently trading at a premium or discount (PI/LTN).

In some embodiments, other assets and financial securities may be analyzed with the same CIM method and key ratios as for stocks. Comparative analysis of investment objects may then be made on the same basis of risk, return, and currency exchange.

On the same basis, all stocks and other assets and financial securities, may be analyzed on the basis of different base-currencies, where, according to one or more embodiments, different cross exchange rate developments may change the relative valuation of investment objects.

Constrained Satisfaction Process

The CIM method, with the genetic FBLB algorithm, may be applied to automatic investment management. CATIS may be based on constrained satisfaction of types of criteria, in order to identify a set of target investment objects within a population, which in practice may be all publicly traded stocks, assets and other securities in all Exchange markets in the world.

FIG. 2 illustrates a constrained satisfaction process of eliminating the universe of investment objects to a set of target investment objects. Referring to FIG. 2, the universe of objects 101 for the usage of the invoked web service may be constrained to target objects 106, by four steps.

First of all, all method constrained objects 102 may be eliminated. In the CIM method and more specifically the application of the genetic FBLB algorithm, this may primarily refer to objects that lack sufficient historic trading track-records. For example, in some embodiments, a minimum of eight to ten years may be used. Investment objects may also be excluded due to lack of corporate data. This also means that over time, method constrained stocks may be included for further analysis, as soon as a sufficient historic stock and corporate track-record is retrieved.

Secondly, CATIS may be based on the process of customization, e.g., fitting investment objects to the client's selected market definition. This step may eliminate client constrained objects 103, typically whole markets and sectors, as well as specific stocks where, for example, a corporate entity may be involved in business activities in conflict with the client's ethics policy.

The third step may be an indicator based elimination, which according to some embodiments may be the task of the customized agent. Indicator constrained objects 104 may be continuously excluded from the set of target objects 106. It is noted, that an individual investment object may belong to 106 discontinuously over time.

The fourth step may involve excluding trading constraint objects 105, which according to some embodiments may be eliminated on the basis of insufficient trading volumes and liquidity, or trading outside of the decided trend channel of buy and sell indicators.

In some embodiments, the CIM method constraint satisfaction process may be a mean-variance risk-return improvement process, from the risk-free return, via market index return to TSN, which includes Alpha. Selected portfolios may outperform TSN and individual TSV may add Alpha in relation to TSN.

CATIS Web Platform

FIG. 3 illustrates one or more aspects of the CATIS platform for communicating client and/or vendor data and information. Referring to FIG. 3, platform 200 may include four component parts: (i) customized agents 205; (ii) database 210; (iii) analytics engine 215; and trading system 220.

In some embodiments, the web platform may enable the development of ancillary CATIS services of different kinds, for example, the development of an investor community where clients can communicate, blog and exchange data and information. This may include the possibility for clients to promote their own agents and enable other members to co-invest. These web services may utilize standardized interfaces for exchanging data over the network, interoperating based on formal definitions which may be independent from the agents and architecture.

Agent

FIG. 4 illustrates an exemplary CATIS agent, having an inference engine, interface system, and risk management system. Referring to FIG. 4, CATIS customized agent 200 may include inference engine 500; interface system 300; and risk management system 400. The CATIS clients may be one or more of private and professional investors, as well as institutions. Clients may, themselves, decide which investment services to use, through interaction and dialogue with the CATIS agent's interface system.

CATIS customized agent 200 may be a dynamic agent with adaptive features and the capability to learn. It may adjust its own configuration according to changes in the market and environment, as well as performance. Policy-controlled profiles may enable dynamic response changes in operator policies and/or network state. Different balancing strategies may be adopted, depending on market conditions such as liquidity and buy indicator identified investment opportunities.

In some embodiments, the CATIS customized agent may be self-optimized and may select a specific client model according to client profile and policies in relation to changes in the market and environment. The choice of portfolio allocation may be triggered by optimizing performance in risk and return terms under dynamic conditions and depending upon the client's selected base currency.

Inference Engine

In some embodiments, inference engine 500 may draw upon heuristic methods and knowledge, and may combine individual rules to draw conclusions and solve larger problems. It may determine the range of possible answers to a problem or issue and specify the data needed to solve the problem, including from what sources this data shall be received. The inference engine rules may not be equivalent to lines of codes, but rather may correspond to combined facts with antecedent and consequent blocks of facts. The rules may be separated and individual, or defined by tree diagrams.

Backward chaining may be used to refer to when the inference engine is goal driven, while forward chaining may refer to when the inference engine is data driven. The CATIS agent may combine backward and forward chaining, depending upon the client's initially provided information. It also may use confidence factors and fuzzy logic to reach best possible fit in providing the client profile 110 and client model 120, as illustrated in FIG. 6.

Interface System

FIG. 5 illustrates a CATIS interface system determining a client profile. Referring to FIG. 5, interface system 300 of the customized agent may serve as the communicator between client 100 and automated agent 200. In some embodiments, this dialogue may be in the form of questions and answers 310.

The first basis questions to be answered through the interface system 300 may be the prospective client's amount to be invested 311, the market definition 312 and the base currency 313, which may be used for performance monitoring and defining iso-prices (IP). In some embodiments, the agent may also establish the client's benchmark objectives 314, risk profile 315, and/or policies on liquidity and exit 316. In total, the Q&A may add up to a client profile 110, which may be utilized in the customization of a client model and risk management system 400.

To guide the Q&A-dialogue, the agent may use expert system technology and mixed chaining, both forward and backward. In forward chaining, the client may have no clear opinion about his target model and the agent may investigate step-by-step by fault diagnosis. In backward chaining, the client may know what he wants, but lack an opinion of model selection and design. In mixed chaining, the agent may use both of these principles of reasoning and deduce progressively when to use forward and backward chaining.

Analytics Engine

The CATIS short-term trading and long-term investing analytics may include input data and input stock indicators to risk management 400 portfolio engine 440, as illustrated in FIG. 7. The input data and stock indicators may be stored in a database 205, as illustrated in FIG. 8.

In some embodiments, the input data may be grouped into: trading data 201, corporate data 202, market data 203, and currency data 204. Input data may come from third party vendors. Stock exchange trading data 201, market data 203 and currency data 204, may be provided real term or end of day, while corporate data 202 may be provided periodically, for example, at quarter intervals or when annual reports become available.

In some embodiments, the analytics engine's output stock indicators may be grouped into CIM indicators 230, fundamental indicators 240, technical indicators 250, and/or triangulated indicators 260, which may combine two or more indicators into one, and correlation indicators 280.

Risk Management

FIG. 7 illustrates an overview of one or more aspects of the CATIS risk management system. Referring to FIG. 7, risk management system 400 may be automatically built and based on the identified and specified client model 120. In some embodiments, the risk management system 400 may be based on the combination of management of whole and parts, of a portfolio and stock picking. The client model 120 may specify the allocation policies 420 for the portfolio and stock picking. This may be made through portfolio indicators 430.

As illustrated by FIG. 9, in some embodiments, portfolio engine 440 may pick stocks through a two-step constrained satisfaction process where potential investment objects may be eliminated. The first step may be based on the selected triangulated indicators 260 and correlation indicators 280, when the majority of potential objects are excluded. The second step may be based on using the buy indicators 123 and sell indicators 124 identified and for final selection, when listings of buy rankings 125 and sell rankings 126 are specified. The main output of the portfolio engine may be to initiate trade execution, providing buy orders and sell orders to trading system 220.

Quality Assurance

In some embodiments, a CATIS agent may include autonomic self-management capabilities. This may be achieved through a quality assurance system. The agent components may autonomously observe, extract, understand, and/or use context information to consequently modify their functionality, according to policies that may be bound to client profile 110 benchmarks and financial objectives.

In some embodiments, the CATIS agent may be self-healing and detect faults in related system components and transparently adapt to circumvent anomalous and dysfunctional allocations and stock picking indicators. The agent may attempt to both detect unpredictable outlier events and to protect against them, and may adapt accordingly.

Moreover, in some embodiments, the CATIS agent may be self-protected and detect unauthorized alterations to client profiles and policies stored in system databases. For example, it may stall operations while detecting irregularities and/or operate with end-to-end encryption of all generated traffic between client and agent.

Interface System

As illustrated by FIG. 5, the CATIS customized agent's interface system 300 may comprise an interactive display web page. Furthermore it may include back-testing, messages and/or performance monitoring of results. The web page may use multiple languages to fit different markets and/or client populations. The interface system may serve as the communicator between client 100 and the automated agent. In some embodiments, this dialogue may take the form of edited questions and answers 310, which may be multiple choice or fill in.

The CATIS interface system 300 may be designed according to a heuristic rule-based approach, a class hierarchy object-based approach, or a combination of the two. In some embodiments, it may be advantageous to utilize a rule based "IF/THEN" type of expert system design. These rules may correspond to logical representations, which may be processed in order to disseminate knowledge in a consistent manner for a given set of data from the client.

Modular Configuration

One object of the interface system may be to determine client model 120. The investment management service applications of CATIS may be differentiated by modular solutions. In some embodiments, client modules 120 may be differentiated in order to fit different needs and preferences of groups and individual clients, termed client profile 110, as illustrated in FIG. 5.

As illustrated in FIG. 6, client model 120 may be selected and defined based on client profile 110 output from interface system 300. In some embodiments, the client models may be grouped into three basic types: discretionary 130, tailored 140, and standard 150. Client models may also be supplied by external partners 700, providing external standard models 160, within the format and requirements of the CATIS web platform.

Discretionary models 130 may be agents that perform investment management services, like a typical asset manager, with only financial objectives and no other limitations in terms of the universe of investment objects 101.

Tailored models 140 may be agents that perform investment management services, which may be uniquely configured to a client defined market, with corresponding objectives and policies. Tailored models 140 may primarily be intended for the institutional markets and, in some embodiments, may be constrained by minimum amounts to be invested.

Standard models 150 may be the greatest type in terms of variety and number of models. Standard models 150 may include, for example, index funds 151, stock funds 152, hedge funds 153, structured products 154, and/or other financial funds 155. One or more CATIS fund models and other structured products and funds may be traded on a public Stock Exchange as exchange-traded funds.

External models 160 may be provided on the CATIS platform by external partners and may, in some embodiments, be divided into funds 161, structured products 162, and/or cash accounts 163.

In some embodiments, customization with standard models 150 may be achieved either through the selection of a specific single model that fits the client profile, or through a selection of multiple models.

Rule Based and Fuzzy Logic

The basic rule-based logic for the modular configuration and applied in the CATIS interface system and its inference engine, may be based on the premise that if the "IF" part is true, the statement in the "THEN" part is also considered true, such as, for example:

IF
   The client's investment amount is less than 1.0 MUSD
THEN
   Provide standard models.

The CATIS interface system rule base logic, may include one or more rules for AND, OR, and include WHILE and FOR loops, such as, for example:

IF
   The client's investment amount is less than 1.0 MUSD
AND
   It is a private investor.
THEN
   Provide standard models.
WHILE
   It is an institution.
THEN
   Ask new question.

The client profiling and modular configuration may also use fuzzy logic to characterize fuzzy sub-ranges of one or several continuous variables. Many of these process steps may use fuzzy matrixes, where combinations of sub-ranges provide inputs to establishing a unique client profile and client model.

Client Profile

In some embodiments, client profile 110 may comprise a six-dimensional matrix (311-316), as illustrated in FIG. 5. Each of these continuous variables may be grouped into fuzzy sub-ranges, and transformed into uniquely different Client profiles, for example, such as the following three distinctly different clients:

| | Private Investor | Active Trader | Institution |
|---|---|---|---|
| 311 Amount Invested | Small, <10k USD | Limited, <100k USD | Medium, 10-20 MEUR |
| 312 Markets | US, UK stocks | Global Stocks | Discretionary |
| 313 Base Currency | USD | USD | EUR |
| 314 Benchmark | S&P 500 | Max Return | LIBOR 1Y + 5% |
| 315 Risk Profile | Low, >1% yield | High | — |
| 316 Liquidity, Exit | Long Term | 24/7 Exit | Annual Review |

These three examples of client profiles 110 may then be the input to be transformed into customized client model 120, as illustrated in FIG. 6. Each profile and customized model may be presented to the client for final confirmation. This presentation may include back-testing of the client model against the selected benchmark.

Client Model

The investment object constrained client model may be matched with all remaining CATIS models. The first step of the configuration process may be to select one of the basic types: discretionary 130, tailored 140 or standard 150.

Client profiles that have selected a Discretionary model 130 may be the easiest and most straight forward agent configuration. For example, they may follow the basic portfolio design of the risk management system 400 and portfolio engine 440 illustrated in FIG. 7. In some embodiments, this general model may include the following four principal target object classes, within a client portfolio:

(i) long and hold only and portfolio internal risk-return absolute benchmark; the sustainable opportunity cost of capital;
(ii) long global to increase (i) return, by limited short-term added risk;
(iii) short global and inverse trading; and
(iv) insurance investing, against negative global market outliers.

Sufficiently large clients that have selected a tailored model 140 may use the same basic discretionary model, with additional constraints and objectives, to achieve a sufficient customization.

For private investor clients, with limited amounts invested, the customized modular configuration of the agent may be achieved by selecting one or more of a combination of standard models to fit client profile 110. One or more of the standard models may be exited or traded at regular intervals, e.g., daily, monthly, quarterly, or annually.

Analytics Engine

CATIS short-term trading and long-term investing analytics may include the same input data and output stock indicators, any or all of which may be inputs to risk management system 400. The input data and all stock and market indicators may be stored in a database 210.

Value-added processing may be made by analytics engine 215. Input data to the analytics engine may be limited to that which is objective and factual, and may come from third party vendors. Output information may include a range of indicators from new updated input data that may be used by the risk management system.

Input Data

In some embodiments, input data may be grouped into: trading data 206, corporate data 207, market data 208, and currency data 209. Stock exchange trading data 206, market data 207 and currency data 209 may be provided real term or end of day, while corporate data 208 may be provided periodically, e.g., at quarter intervals or when annual reports become available.

Trading data 206 may include data regarding stock prices, such as: daily opening and closing price, high, lows, averages, and spreads, as well as trade volumes.

Corporate data 202 may include one or more fundamental key ratios per share for a stock, such as: EPS (earnings per share), P/E (price/earnings), P/BV (price/book value) and Yield (dividends/price). In some embodiments, forecast information may not be included, and only factual reported corporate data may be included.

Market data 203 may include index data of market performance as a whole and by sectors and other defined market segments.

Currency data 204 may be stored in the database matrix with exchange rates between a range of base currencies that may be selected by groups of clients from different countries. In some embodiments, gold may be selected as the base-currency and exchanged with all stocks, assets and financial securities owned as investment objects, in the performance reporting.

Stock Indicators

In some embodiments, output stock and stock market indicators may be grouped into CIM indicators 230, fundamental indicators 240, technical indicators 250, and/or triangulated indicators 260, which may combine two or more indicators into one. Fundamental, technical, and triangulated indicators may be used for the constrained satisfaction process of limiting the number of target objects.

Fundamental indicators may be equal to fundamental input data, but may also serve as trend indicators of historic corporate performance, such as: 1Y, 3Y, 5Y and 10Y rolling averages of: EG (earnings growth), PEG (price/earnings growth), and DG (dividend growth). Other more complex fundamental indicators may be included, for example, to monitor the relative growth of one performance factor in relation to another, or to monitor growth factors in relation to market developments.

In some embodiments, technical indicators may monitor stock market trends in terms of prices and volumes, and may include ratios such as: Momentum (the rate of price change), ADI (average directional index), MACD (moving average convergence/divergence), RSI (relative strength index). Volume based technical indicators may monitor the market as a whole, such as: On-balance volume (the momentum of buying to selling), Money flow (amount of traded stocks on days when price went up).

Criteria for CATIS stock picking may include one or more CIM indicators, which may enable comparative analysis of stocks regardless of markets, sectors, or business activity: (i) TSV, (ii) P/LTV, (iii) Beta value risk ($\beta_{LTV}$), (iv) Iso-Price (IP), and (v) Iso-Value (IV). In some embodiments, TSV may be the key ratio for long term hold investing, while P/LTV may increase in relative importance the shorter and more flexible an exit is wanted, e.g., as may be indicated by a client profile. The Beta value risk ratio ($\beta_{LTV}$) may be applied as a key risk monitor in triangulated indicators, and, in some embodiments, Iso-Prices (IP) and Iso-Values (IV) may be used to compare stock price equivalents in a portfolio and/or in pair trading.

Triangulated Indicators

Triangulated indicators may refer to several indicators used in combination to strengthen the relative analysis of trends and momentum. A triangulated indicator may include several indicators within technical analysis or fundamentals, or a combination of both. In some embodiments, one indicator may always be a CIM indicator. The triangulation indicators may state minimum/maximum requirements for elimination, using combinations of AND, OR rules, and fuzzy sets.

A typical first and basic triangulation for a long only investment can, for example, be coded as follows:

IF
    Earnings Growth 1Y<3Y<10Y
AND
    TSV<8.0%
AND
    P/LTV>0.8
THEN
    Exclude stock.

For more short term trading a buy indicator may not be required, nor any correlation indicator. Instead a triangulation indicator may be, for example, a continuous global stock search, which may be coded as follows:

IF
    TSV has changed last day
AND
    TSV increased
AND
    TSV>8.0%
AND
    P/LTV<0.7
AND
    RSI>50
THEN
    Put stock on buy list at max 1.05 P and sell at 1.3 P, latest within three months.

Markets and Sector Indicators

In some embodiments, markets may be arbitrary or contextually defined, by a client or a standard model. Traditional market and sector indicators, provided by Stock Exchanges or vendors are normally capital weighted. CATIS market and sectors indicators may be weighted differently depending on context and client model. For example, they can be means and medians, or liquidity weighted. Still, traditional market and sector indicators may be used as benchmarks.

Criteria for CATIS portfolio target allocation may include the two CIM indicators for markets and sectors: (i) TSN and (ii) PI/LTN, which may enable comparative analysis of markets and sectors sustained return to stockholders, and the position of each market or sector in term of pricing.

The TSN and PI/LTN indicators may also be used in triangulated indicators, in order to establish a stocks position in relation to the market or a sector, or a client selected portfolio, for example, as follows for a rebounding bear market:

IF
    PI/LTN<0.7
AND
    TSN>TSN(1Y)
AND
    TSV>15%
THEN
    Select buy indicator P/LTV<0.7.

Correlation Data and Indicators

Correlation data 270 may be analytics engine processed inputs for stocks value correlations in relation to a market, sector, or portfolio. In some embodiments, the key correlation data inputs may be stocks' (i) LTV Variance and (ii) P/LTV Variance, and markets/sectors/portfolios' (iii) LTN Variance and (iv) PI/LTN Variance, measured during minimum eight to ten years.

From the correlation data, correlation indicators 280 may be computed by algorithms for: (i) LTV Covariance=$(\text{cov}_{LTV,LTN})$ and (ii) LTV Correlation coefficient=$(\rho_{LTV})$. The correlation indicators may be measured during minimum ten years, in order to achieve best possible robustness and validity. Still, correlation may not imply causation, but may serve the purpose as an indicator and stronger indicators may be more likely than weak and may fit well in combination with triangulation indicators. In addition, conditional correlation indicators may be used, splitting up data samples, for example, in relation to PI/LTN subsets.

In some embodiments, financial and stock markets are not normal distributed, rather they may be skewed and have fat tails. Correlation indicators may, therefore, include data of the third and fourth moment of distribution and their correlations, such as, for example: (i) tail value at risk and (ii) expected shortfall, where the objective may be to achieve a coherent risk measure for a contextually defined portfolio of stocks, assets or other financial instruments.

In order to reduce the risk of overfitting, correlation indicators may also use ranks of TSV and subsequent TSV (information coefficients), rather than the LTV values themselves.

Risk Management

Investment management may be considered the pursuit of the best possible risk-relative returns in terms of a base-currency. One objective of CATIS agent risk management system may be to achieve this, in relation to what a client has formulated as his investor profile, and from which a client module may have been configured.

Customized agent's risk management system 400 may automatically be built and may be based on specified subsystems and processing:
  (i) Client model 120.
  (ii) Allocation policies 420.
  (iii) Portfolio indicators 430.
  (iv) Portfolio engine 440.
  (v) Quality assurance 450.

The outputs of the risk management system may be buy orders and/or sell orders that automatically become trade transactions in trading system 220.

In some embodiments, risk management system 400 may be based on the combination of management of whole and parts, of allocating a portfolio and stock picking Client models 120 for discretionary and tailored services may directly specify allocation policies 420 for the portfolio.

For standard services allocation policies may be given by CATIS funds and their specified policies. From the standard client's perspective, the allocation may be made through the selection of a best fitted fund product or multiple funds, in relation to investment profile 110.

In some embodiments, all CATIS owned standard funds may apply the same general allocation and stock picking principles and methods as discretionary and tailored client models.

The starting point in the risk management system may be to transform a client model 120 into allocation policies 420, as illustrated in FIG. 9. This may involve two main client customization outputs:

(i) Target allocation 121.
  (ii) Re-allocation policies 122.

In some embodiments, transformation of client model 120 into allocation policies 420 may be achieved using fuzzy logic and/or subsets, depending upon market and/or environmental factors.

General Multi-Target Allocation Model

CATIS risk management system design may be differentiated in four target object types and models, as in 5.5.2:
  (i) Long and hold only and portfolio internal risk-return absolute benchmark; the sustainable opportunity cost of capital.
  (ii) Long global to increase (i) return, by limited short-term added risk.
  (iii) Short global and inverse trading.
  (iv) Insurance investing, against negative global market outliers.

In some embodiments, the basic target allocation may be a multi-model of the four basic types, and the allocation may be set in percentages. The allocation of the target object types may be dynamic and/or dependent upon market factors and the business cycle, creating risk-adjusted return value added for the portfolio as a whole.

A fuzzy matrix of a target allocation may express rules in tabular form, with two variables, while in a client model more than two dimensions may generally be applied. Below, an example of target object types and their allocation, including cash per market position in terms of PI/LTV, presented as an example of a tailored client model:

|  | Allocation (%) | | | |
| --- | --- | --- | --- | --- |
|  | PI/LTN <0.7 | PI/LTN 0.7-1.0 | PI/LTN 1.0-1.2 | PI/LTN >1.2 |
| Long & hold (i) | 33.8% | 45.5% | 54.0% | 58.5% |
| Long global (ii) | 60.0% | 45.0% | 30.0% | 15.0% |
| Short global (iii) | 5.0% | 7.0% | 10.0% | 15.0% |
| Insurance (iv) | 0.2% | 0.5% | 1.0% | 1.5% |
| Cash | 1.0% | 3.0% | 5.0% | 10.0% |

Long and Hold:

Long and hold (i) may refer to the basic target object type for all discretionary client models and the majority of tailored client models as well. Long and hold (i) may be a long-term buy and hold strategy model based on high TSV stocks, purchased at attractive P/LTV rates. High TSV stocks may have confirmed Alpha, higher return at lower risk than the defined market. Long only models may have two basic positions: invested or liquid, e.g., cash in the form of the client selected base-currency. A long only model may have a policy of zero cash, e.g., to always be fully invested.

Long Global:

Long global (ii) may refer to client models that serve the purpose of increasing returns at controllable short-term risk and in relation to the opportunity cost of capital, e.g., the long only risk-adjusted return. This may be achieved through different strategies in the target allocation, for example:
  (i) Leverage: In some embodiments, this may be buying Long Only stocks with leverage, for example:
    IF
      TSV>15.0%
      AND P/LTV<0.6
AND
PI/LTN<0.7
THEN
Buy up to 1.05 P with 50% leverage, sell at 1.0 P/LTV.

(ii) Options: In some embodiments, this may be buying long call options in Long Only stocks, with the same basic conditions as in example (i).

(iii) Extreme stock-picking: In some embodiments, this may be buying global outlier top performance stocks, at low pricing, for example:
IF
TSV>30.0%
AND
P/LTV<0.8
AND
PI/LTN<0.7
THEN
Hold portfolio of top 100 global stocks buy at 1.10 P, sell at 1.0 P/LTV.

Short Global:

Short global (iii) may refer to profiting on falling pricing, investing against the market, on sufficiently liquid stocks. Hence, in some embodiments, this may include shorting stocks in premium priced markets, such as, for example:
IF
PI/LTN>1.3
AND
P/LTV>1.5
THEN
Sell short, when debt of market is sufficient.

Since short global may be extraordinary high risk positions, in some embodiments, risk may be balanced by the size and numbers of positions.

Insurance Investing:

Insurance investing (iv) may refer to reducing the effects from market collapses. The strategies may be based on losing all invested capital at normal market condition and making extraordinary returns, at the time of outlier events and situations.

Special Target Allocation Models

In some embodiments, CATIS risk management system may allow for the design of tailored and standard client models that require special target allocations. This may include, for example, structured products and/or derivatives.

Re-Allocation Policies

In some embodiments, the CATIS risk management system may be based on dynamic models that are self-configurated. This means that all customized agents may have re-allocation policies that may adapt to market developments. The self-configuration may be triggered by business cycles and/or market positions.

Business cycle self-configuration may be based on sector model portfolios (e.g., SIC-coded) that take into account which sectors are leaders and followers in relation to the market.

Market positions may be self-configured for international model portfolios based on different pricing positions, e.g., different PI/LTN ratios, such as, for example:
IF
PI/LTN>1.2
THEN
Underweight market with 0.8× in a portfolio.
AND
IF
PI/LTN<0.8
THEN
Overweight market with 1.2× in a portfolio.

Portfolio Indicators

In some embodiments, the CATIS risk management system may have differentiated indicators that may perform different parts in the constrained satisfaction process. Individual indicators (230/240/250) may be inputs to triangulated indicators 260 and correlation indicators 280, which together with buy indicators 123 and sell indicators 124 may be the customized portfolio indicators 430.

The process of developing customized buy indicators 123 and sell indicators 124, may start by selecting individual indicators (230/240/350) for designing triangulation indicators 260. After triangulation has eliminated investment objects, correlation indicators 280 may be applied for final elimination. After this step, buy indicators 123 and sell indicators 124 may be applied for stock picking in portfolio engine 440.

Portfolio Engine

Referring to FIG. 7, portfolio engine 440 may be a motor-like four step process, where:
(i) New data and information may be induced,
(ii) New or existing buy indicators and sell indicators may be compressed,
(iii) Quality may be assured, and
(iv) New listings and orders for trade may be ignited, through trading system 220.

In some embodiments, portfolio engine 440 may be part of the constrained satisfaction process, where potential investment objects may not only be eliminated, but also selected, and trades automatically transacted.

FIG. 10 illustrates a process of transforming buy and sell indicators to buy and sell rankings in the portfolio engine. Referring to FIG. 10, there may be four inputs of new data and information:
(i) Trading data 206, Corporate data 207, Market data 208, and Currency data 209.
(ii) Buy indicators 123.
(iii) Sell indicators 124.
(iv) List of holdings 130.

Compression may be achieved by comparing the target allocation with the list of holdings. Any misfits may be reflected in the buy rankings and sell rankings that may be produced through the input buy and sell indicators.

The application of the buy indicators 123 and sell indicators 124 may provide listings of buy rankings 125 and sell rankings 126, in terms of client priority and attractiveness.

Listings for trading 127 may be defined in terms of how many transactions and transaction size. Thereafter all transactions may be quality assured 450.

Quality Assurance

In some embodiments, any or all of CATIS risk management system's listings for trading 127 may be controlled in quality assurance system 450, where client model total channel trading and investing may be monitored, and each positions limit prices with stop loss rules may be controlled, including take profit policies.

The Q&A may operate independently from the listing flow of buy and sell orders. This may involve the discontinuous, normally end of day, scenario simulations of client model and allocation policies.

Trading System

Trading systems may be part of the web platform or separate, e.g., run by a partner. The trading system may involve three basic steps: (i) Trade transaction 221, (ii) Clearing process 222, (iii) Settlement process 223, which may feed back the list of holdings 130 for update analysis.

Learning Engine

CATIS learning engine 600 may comprise a number of software programs running separate from the web platform. The learning engine may process information and may learn about concepts and context interaction, and may systematically:
  (i) Monitor customized agents 200 and their performance patterns over time and in specific situations.
  (ii) Develop new and improved versions of the standard model agents.

Monitoring Customized Agents

The monitoring of customized agents may involve all new data and processed information by the analytics engine, all decision-making rules and connected to market and environmental events. The purpose of the learning engine 600 may be to improve the client model 120 and allocation policies 420 of the customized agent 200, beyond what is possible by the existing re-allocation policies 122 and quality assurance 450. This may be achieved by regularly launching updated versions of the customized agent.

In some embodiments, the testing and improvements of the customized agent 200, may strive to achieve, among all:
  (i) Better fitness to financial objectives.
  (ii) More coherent allocation policies.
  (iii) Better indicators to pre-empt market changes.

The basic development principle of this processing may be to back test existing and alternative rule parameters, and then to modify rules or the definition and structure of fuzzy sets used by the customized agent.

Genetic Algorithms for New Standard Models

Independently of clients, the learning engine may operate to identify new and market outperforming standard models. This processing may involve the development of new fund products that CATIS may launch.

The genetic algorithms in the CATIS learning engine may be based on multiple vectors of parameters values, among all: risk, return, correlation, and base-currency. The entire population of investment objects and portfolios may be a collection of vectors. Vectors may be selected on the basis of tractability, predictability, and/or robustness, eliminating noise and reducing the risks for overfitting to a minimum.

A learning engine genetic algorithm may operate on defined initial rules and fuzzy sets, where the set of vectors of the population is provided, and crossovers between recombined investment objects and portfolios are carried out and back tested. CATIS learning engine may use the variety of statistical tick-level backtesting models, with limit-order fill assumptions and accounting for commissions and slippage, such as VaR, ETL, and/or Monte Carlo simulations.

The formation process may result in a set of new vectors, which may further be modified by randomly within allowed boundaries altered parameters, leading to arbitrarily modified portfolios and investment objects, which may yield a new suggested set of vectors.

The process may be automatically repeated until the best fit portfolio with investment objects is selected, based on a defined success criteria or benchmark, which may be CATIS standard model objectives, or client model defined.

FIG. 11 illustrates an exemplary apparatus for performing one or more functions described herein. Referring to FIG. 11, apparatus 1100 may include communication interface 1102. Communication interface 1102 may be any device capable of sending and/or receiving messages via one or more networks (e.g., an Ethernet card, wireless communication interface, or cellular communication interface). Apparatus 1100 may also include one or more processors 1104, memory 1106, and/or non-volatile storage 1108. Communication interface 1102, processor(s) 1104, memory 1106, and/or non-volatile storage 1108 may be operative to communicate with one another via data bus 1110. Memory 1106 may include one or more program modules 1112. Program module(s) 1112 may comprise executable instructions that when executed by processor(s) 1104 cause apparatus 1100 to perform one or more functions described herein.

FIG. 12 illustrates an exemplary method according to one or more embodiments. Referring to FIG. 12, in step 1200 information indicating one or more investment objectives, risk tolerances, or liquidity requirements may be received. In step 1202, a client profile may be created or modified based on the received information. In step 1204, an investment option may be identified for an investment client based on a client profile associated with the investment client.

One or more aspects of the disclosure may be embodied in computer-usable data or computer-executable instructions, such as in one or more program modules, executed by one or more computers or other devices. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. As will be appreciated, the functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Although not required, one of ordinary skill in the art will appreciate that various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more transitory or non-transitory computer-readable media.

As described herein, the various methods and acts may be operative across one or more computing servers and one or more networks. The functionality may be distributed in any manner, or may be located in a single computing device (e.g., a server, a client computer, or the like).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A method, comprising:
    receiving, by a web-services platform comprising a memory and at least one processor, information indicating one or more benchmarks, one or more policies, and one or more risk profiles from a plurality of agent devices, each of the agent devices being configured to communicate with at least one of a plurality of clients via an interface system comprising an interactive webpage,
    wherein the interactive webpage comprises one or more user interfaces configured to mediate a plurality of questions regarding the one or more benchmarks, the one or more policies, and the one or more risk profiles;
    creating or modifying, by the web-services platform, a plurality of client profiles based on the information, each of the plurality of client profiles being associated with at least one of the plurality of clients;
    receiving, by the web-services platform, from the at least one of the plurality of clients and via the interface system, a request for a web service;
    identifying, by the web-services platform, from among a plurality of possible options and based on a client profile of the plurality of client profiles that is associated with one of the plurality of clients, the web service for the one of the plurality of clients;
    transmitting, by the web-services platform and via the interface system, a request to confirm the identified web service for the one of the plurality of clients;
    providing, by the web-services platform and based on a response to the request, the identified web service for the one of the plurality of clients in accordance with the one or more benchmarks, the one or more policies, and the one or more risk profiles; and
    modifying, by the web-services platform, functionality of the web service based on autonomously observing context information associated with the one or more benchmarks, one or more policies, and the one or more risk profiles.

2. The method of claim 1, wherein providing the web service comprises providing a service for the one of the plurality of clients to share an agent of the one of the plurality of clients with a different client of the plurality of clients.

3. The method of claim 1, comprising:
    transmitting, by the web-services platform and via the interface system, a request for additional information regarding the one or more benchmarks, the one or more policies, and the one or more risk profiles;
    receiving, by the web-services platform and via the interface system, the additional information regarding the one or more benchmarks, the one or more policies and the one or more risk profiles; and
    updating, by the web-services platform, the one or more benchmarks, the one or more policies, and the one or more risk profiles based on the additional information regarding the one or more benchmarks, the one or more policies, and the one or more risk profiles.

4. The method of claim 1, wherein the plurality of agent devices comprises at least one agent device customized by the one of the plurality of clients.

5. The method of claim 4, wherein the at least one agent device customized by the one of the plurality of clients is configured to provide the one or more benchmarks, the one or more policies, and the one or more risk profiles from a system associated with the one of the plurality of clients.

6. The method of claim 5, wherein the system associated with the one of the plurality of clients generates the one or more benchmarks, the one or more policies, and the one or more risk profiles based on one or more benchmarks or policies of a plurality of constituent clients of the one of the plurality of clients that utilize the system associated with the one of the plurality of clients.

7. The method of claim 6, wherein the web service for the one of the plurality of clients corresponds to the one or more benchmarks or policies of the plurality of constituent clients of the one of the plurality of clients that utilize the system associated with the one of the plurality of clients.

8. A web-services platform, comprising:
    at least one processor; and
    a memory storing instructions that, when executed by the at least one processor, cause the web-services platform to:
        receive information indicating one or more benchmarks, one or more policies, and one or more risk profiles from a plurality of agent devices, each of the agent devices being configured to communicate with at least one of a plurality of clients via an interface system comprising an interactive webpage,
        wherein the interactive webpage comprises one or more user interfaces configured to mediate a plurality of questions regarding the one or more benchmarks, the one or more policies, and the one or more risk profiles;
        create or modify a plurality of client profiles based on the information, each of the plurality of client profiles being associated with at least one of the plurality of clients;
        receive, from the at least one of the plurality of clients and via the interface system, a request for a web service;
        identify, from among a plurality of possible options and based on a client profile of the plurality of client profiles that is associated with one of the plurality of clients, the web service for the one of the plurality of clients;
        transmit, via the interface system, a request to confirm the identified web service for the one of the plurality of clients;
        provide, based on a response to the request, the identified web service for the one of the plurality of clients in accordance with the one or more benchmarks, the one or more policies, and the one or more risk profiles; and
        modify functionality of the web service based on an autonomous observation of context information associated with the one or more benchmarks, the one or more policies, and the one or more risk profiles.

9. The web-services platform of claim 8, wherein providing the web service comprises providing a service for the one of the plurality of clients to share an agent of the one of the plurality of clients with a different client of the plurality of clients.

10. The web-services platform of claim 8, wherein the memory stores further instructions that, when executed by the at least one processor, cause the web-services platform to:
    send, via the interface system, a request for additional information regarding the one or more benchmarks, the one or more policies, and the one or more risk profiles;

receive, via the interface system, the additional information regarding the one or more benchmarks, the one or more policies, and the one or more risk profiles; and update the one or more benchmarks, the one or more policies, and the one or more risk profiles based on the additional information regarding the one or more benchmarks, one or more policies, and one or more risk profiles.

11. The web-services platform of claim 8, wherein the plurality of agent devices comprises at least one agent device customized by the one of the plurality of clients.

12. The web-services platform of claim 11, wherein the at least one agent device customized by the one of the plurality of clients is configured to provide the one or more benchmarks, the one or more policies, and the one or more risk profiles from a system associated with the one of the plurality of clients.

13. The web-services platform of claim 12, wherein the system associated with the one of the plurality of clients generates the one or more benchmarks, the one or more policies, and the one or more risk profiles based on one or more benchmarks or policies of a plurality of constituent clients of the one of the plurality of clients that utilize the system associated with the one of the plurality of clients.

14. The web-services platform of claim 13, wherein the web service for the one of the plurality of clients corresponds to the one or more benchmarks or policies of the plurality of constituent clients of the one of the plurality of clients that utilize the system associated with the one of the plurality of clients.

15. One or more non-transitory computer-readable media having instructions stored thereon, that when executed by one or more computers, cause the one or more computers to:

receive information indicating one or more benchmarks, one or more policies, and one or more risk profiles from a plurality of agent devices, each of the agent devices being configured to communicate with at least one of a plurality of clients through an interface system comprising an interactive webpage, wherein the interactive webpage comprises one or more user interfaces configured to mediate a plurality of questions regarding the one or more benchmarks, the one or more policies, and the one or more risk profiles;

create or modify a plurality of client profiles based on the information, each of the plurality of client profiles being associated with at least one of the plurality of clients;

receive, from the at least one of the plurality of clients and through the interface system, a request for a web service;

identify, from among a plurality of possible options and based on a client profile of the plurality of client profiles that is associated with one of the plurality of clients, the web service for the one of the plurality of clients;

transmit, through the interface system, a request to confirm the identified web service for the one of the plurality of clients;

provide, based on a response to the request, the web service for the one of the plurality of clients in accordance with the one or more benchmarks, the one or more policies, and the one or more risk profiles; and modify functionality of the web service based on an autonomous observation of context information associated with the one or more benchmarks, the one or more policies, and the one or more risk profiles.

16. The one or more non-transitory computer-readable media of claim 15, wherein providing the web service comprises providing a service for the one of the plurality of clients to share an agent of the one of the plurality of clients with a different client of the plurality of clients.

17. The one or more non-transitory computer-readable media of claim 15, wherein the instructions, when executed by the one or more computers, cause the one or more computers to:

provide an interactive web site to interface with a web-services platform provided by the one or more computers;

send a request for additional information regarding the one or more benchmarks, the one or more policies, and the one or more risk profiles;

receive, via the interactive web site, the additional information regarding the one or more benchmarks, the one or more policies, and the one or more risk profiles; and update the one or more benchmarks or policies based on the additional information regarding the one or more benchmarks, the one or more policies, and the one or more risk profiles.

18. The one or more non-transitory computer-readable media of claim 15, wherein the plurality of agent devices comprises at least one agent device customized by the one of the plurality of clients, wherein the at least one agent device customized by the one of the plurality of clients is configured to provide the one or more benchmarks, the one or more policies, and the one or more risk profiles from a system associated with the one of the plurality of clients.

19. The one or more non-transitory computer-readable media of claim 18, wherein the system associated with the one of the plurality of clients generates the one or more benchmarks, the one or more policies, and the one or more risk profiles based on one or more benchmarks or policies of a plurality of constituent clients of the one of the plurality of clients that utilize the system associated with the one of the plurality of clients.

20. The one or more non-transitory computer-readable media of claim 19, wherein the web service for the one of the plurality of clients corresponds to the one or more benchmarks or policies of the plurality of constituent clients of the one of the plurality of clients that utilize the system associated with the one of the plurality of clients.

* * * * *